(12) United States Patent
Ma

(10) Patent No.: US 11,565,433 B2
(45) Date of Patent: Jan. 31, 2023

(54) BIDIRECTIONAL DRIVING MECHANISM FOR ELECTRIC SCISSORS BLADES AND ELECTRIC SCISSORS BLADES

(71) Applicant: DongGuan Koham Industrial Co., Ltd., Dongguan (CN)

(72) Inventor: Xianpeng Ma, Dongguan (CN)

( * ) Notice: Subject to any disclaimer, the term of this patent is extended or adjusted under 35 U.S.C. 154(b) by 0 days.

(21) Appl. No.: 17/368,862

(22) Filed: Jul. 7, 2021

(65) Prior Publication Data

US 2021/0331337 A1    Oct. 28, 2021

(30) Foreign Application Priority Data

Dec. 24, 2020   (CN) .......................... 202011553727.4

(51) Int. Cl.
*B26B 15/00* (2006.01)
*B26B 13/28* (2006.01)
(52) U.S. Cl.
CPC .............. *B26B 15/00* (2013.01); *B26B 13/28* (2013.01)
(58) Field of Classification Search
CPC ......... B26B 15/00; B26B 13/00; B26B 13/28; B26B 13/285
See application file for complete search history.

(56) References Cited

U.S. PATENT DOCUMENTS

| 8,122,607 | B2* | 2/2012 | Maniwa | B26B 15/00 30/228 |
| 8,813,370 | B2* | 8/2014 | Pellenc | B26B 15/00 30/247 |
| 8,893,390 | B2* | 11/2014 | Nie | B26B 15/00 30/247 |
| 9,120,235 | B2* | 9/2015 | Maniwa | A01G 3/037 |
| 9,616,508 | B2* | 4/2017 | Han | B26D 3/169 |
| 9,757,869 | B1* | 9/2017 | Wada | B26B 15/00 |
| 9,796,099 | B2* | 10/2017 | Sandefur | B26B 15/00 |
| 10,099,392 | B2* | 10/2018 | Suda | H02K 7/06 |
| 2005/0115081 | A1 | 6/2005 | Tu | |
| 2005/0160606 | A1* | 7/2005 | Yao | B26B 15/00 30/228 |
| 2008/0263872 | A1* | 10/2008 | Ferk | B26B 15/00 30/228 |
| 2009/0241351 | A1* | 10/2009 | Maniwa | B26B 15/00 30/228 |
| 2009/0271991 | A1* | 11/2009 | Clark | B23D 29/005 30/228 |

(Continued)

*Primary Examiner* — Sean M Michalski
*Assistant Examiner* — Richard D Crosby, Jr.
(74) *Attorney, Agent, or Firm* — Rumit R. Kanakia

(57) ABSTRACT

The present disclosure relates to the technical field of electric scissors, and in particular relates to a bidirectional driving mechanism for electric scissors blades and electric scissors. The bidirectional driving mechanism for electric scissors blade includes a fixed seat, a driving gear, a rotating shaft member, an upper blade group and a lower blade. The driving gear and the rotating shaft member are arranged on fixed seat, the lower blade and the upper blade group rotate around the rotating shaft member, an outer rack is arranged at a rear part of the lower blade, a front part of the upper blade group is an upper blade, a rear part of the upper blade group is a meshing block, and an inner rack is arranged at a rear part of the meshing block; and the inner rack and the outer rack are respectively meshed with both sides of the driving gear.

9 Claims, 4 Drawing Sheets

(56) References Cited

U.S. PATENT DOCUMENTS

| | | | |
|---|---|---|---|
| 2010/0028091 A1 | 2/2010 | Satran et al. | |
| 2010/0077621 A1* | 4/2010 | Quigley | B26B 15/00 30/228 |
| 2010/0269355 A1* | 10/2010 | Yang | A01G 3/037 30/228 |
| 2012/0246942 A1* | 10/2012 | Nie | A01G 3/037 30/247 |
| 2013/0000130 A1 | 1/2013 | Maniwa | |
| 2013/0055574 A1* | 3/2013 | Nie | B26B 15/00 30/228 |
| 2015/0121706 A1* | 5/2015 | Zurcher | F16D 3/2052 74/89.36 |
| 2016/0150738 A1* | 6/2016 | Hall | A01G 3/037 30/228 |
| 2016/0219793 A1* | 8/2016 | Xianpeng | A01G 3/037 |
| 2017/0036359 A1* | 2/2017 | Suda | A01G 3/037 |
| 2017/0251607 A1* | 9/2017 | Pellenc | A01G 3/037 |
| 2017/0359962 A1* | 12/2017 | Ma | A01G 3/037 |
| 2018/0103593 A1* | 4/2018 | Zador | B26B 15/00 |
| 2018/0326601 A1* | 11/2018 | Sandefur | B26B 15/00 |
| 2020/0086514 A1* | 3/2020 | Hsieh | B26B 15/00 |
| 2021/0299894 A1* | 9/2021 | Lu | A01G 3/037 |

* cited by examiner

BIDIRECTIONAL DRIVING MECHANISM FOR ELECTRIC SCISSORS BLADES AND ELECTRIC SCISSORS BLADES

TECHNICAL FIELD

The present disclosure relates to the technical field of electric scissors, and in particular relates to a bidirectional driving mechanism for electric scissors blades and an electric scissors.

BACKGROUND

Electric scissors are branch and trunk pruning tools used for orchards, gardens, vines, 0 and the like. According to a traditional bidirectional drive mechanism for electric scissors blades, a driving gear is used to drive two bevel gears, and is then meshed with a swing arms with two racks through the bevel gears to drive two blades of the scissors to shear. However, the electric scissors of this structure have a large number of parts structurally, which makes it difficult to assemble, and this complex structure used is difficult to disassemble and to replace a certain part. In case of being damaged, the electric scissors need to be replaced entirely. In order to solve this problem, the applicant proposed a Chinese patent with number: CN202020466816.4 (published as CN212487415), entitled as "a novel electric scissors blade dual driving mechanism," which uses a gear connected to the motor to directly drive two blades with racks, such that the two blades of the scissors are directly driven to shear. The bevel gear is removed and the number of parts is reduced. However, 0 the design of this structure has the following problems:

First, for a thickness of the electric scissors, it is necessary to consider a diameter of the gear and thicknesses of the two blades. In order to ensure the meshing of the driving gear with the rack, a rear part of the blade must have a large thickness, but such a large thickness will hinder the blade when shearing some intricate vines and branches, causing inaccurate shearing.

Second, when the rear parts of the two blades swing to a maximum extent, the meshing degree between the driving gear and teeth will be affected to a certain extent, which will cause the blades to open outwards when cutting some thicker vines and branches, causing damage to the electric scissors and reducing service life thereof.

In view of this, it is necessary to further propose an improved solution to solve the problems above-mentioned.

SUMMARY

In view of this, the present disclosure is mainly directed to provide a bidirectional driving mechanism for electric scissors blades.

The present disclosure adopts the following technical solutions:

A bidirectional driving mechanism for electric scissors blade includes a fixed seat, a driving gear, a rotating shaft member, an upper blade group and a lower blade. The driving gear and the rotating shaft member are arranged on the fixed seat, the lower blade and the upper blade group rotate around the rotating shaft member, an outer rack is arranged at a rear part of the lower blade, a front part of the upper blade group is an upper blade, a rear part of the upper blade group is a meshing block, and an inner rack is arranged at a rear part of the meshing block; and the inner rack and the outer rack are respectively meshed with both sides of the driving gear.

Preferably, the rotating shaft member includes a stop screw and a nut, a rotating shaft hole D is provided in the fixed seat, and the stop screw passes through the rotating shaft hole D and is in threaded connection with the nut.

Preferably, the stop screw comprises a connecting rod and a limiting cap, one end of the connecting rod is engaged with the limiting cap, and the other end of the connecting rod is provided with threads.

Preferably, a rotating shaft hole A is provided in a front part of the meshing block, a rotating shaft hole B is provided in a rear part of the upper blade, a rotating shaft hole C is provided in a middle part of the lower blade, and the rotating shaft hole A, the rotating shaft hole B and the rotating shaft hole C all rotate around the rotating shaft member; a pin hole E is also provided in the front part of the meshing block, a pin hole F is provided in the rear part of the upper blade, and a pin is connected in both the pin hole E and the pin hole F.

Preferably, a first protrusion is arranged at the front part of the meshing block, and the pin hole E is located at the first protrusion; and a second protrusion is arranged at the rear part of the upper blade, and the pin hole F is located at the second protrusion.

Preferably, the first protrusion is arranged at a front upper side of the shaft hole A, and the second protrusion is arranged at a front upper side of the shaft hole B.

Preferably, the outer rack and the inner rack are of arc-shaped structures.

Preferably, a gear hole is provided in the fixed seat, a deep groove bearing is connected in the gear hole, and a pin shaft of the driving gear is in running fit with the deep groove bearing.

An electric scissors includes a driving assembly. An output end of the driving assembly is dynamically connected to the pin shaft of the driving gear to drive the driving gear to rotate.

Compared with the prior art, the present disclosure has the following beneficial effects:

The driving gear and the rotating shaft member are arranged on the fixed seat, and the rotating shaft member makes the upper blade group and the lower blade rotate around it. Moreover, the meshing block is arranged, the inner rack is arranged at the rear part of the meshing block, the inner rack faces the outer rack at the rear part of the lower blade, and both sides of the driving gear are meshed with the inner rack and the outer rack respectively. Through this structure, the inner rack and the driving gear are located behind the outer rack, and there is no need to provide a position for mounting the driving gear between the upper blade and the lower blade, such that the thickness is reduced.

When driving, the driving gear, the upper blade and the lower blade all rotate in a circumferential direction in the same plane, and the situation that the upper blade and the lower blade open outwards since the circumferential rotation of the gear and the circumferential rotation of the upper blade and the lower blade are perpendicular to each other is avoided, thereby improving the stability of the bidirectional driving mechanism of electric scissors blades, and making the bidirectional driving mechanism of electric scissors blades more durable.

DESCRIPTION OF THE EMBODIMENTS

Figure 1:
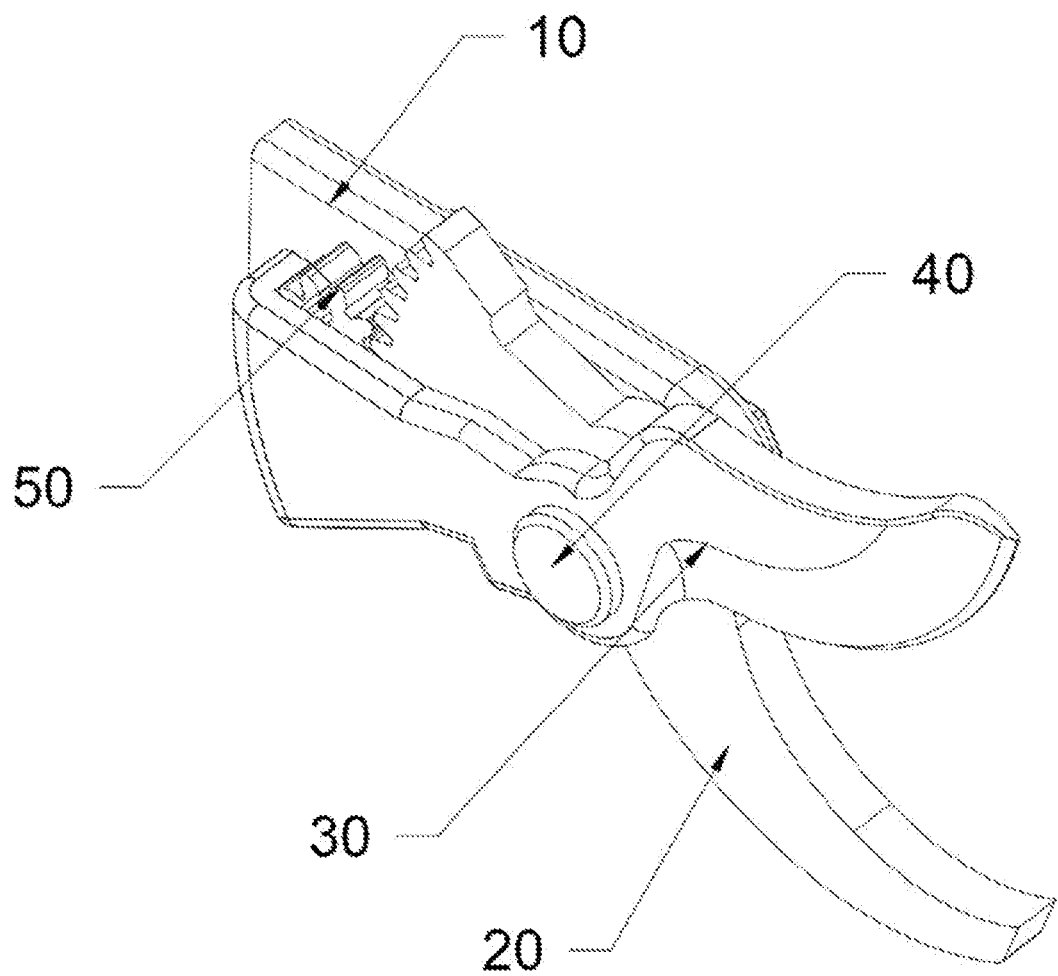
FIG. 1 is a schematic structural diagram of Embodiment 1 of the present disclosure.

The present disclosure will be described in detail below with reference to embodiments and drawings.

Referring to FIG. 1 to FIG. 4, the present disclosure provides a bidirectional driving mechanism for electric scissors blades, including a fixed seat 10, a driving gear 50, a rotating shaft member 40, an upper blade group 30 and a lower blade 20. The driving gear 50 and the rotating shaft member 40 are arranged on the fixed seat 10, the lower blade 20 and the upper blade group 30 rotate around the rotating shaft member 40, an outer rack 21 is arranged at a rear part of the lower blade 20, a front part of the upper blade group 30 is an upper blade 32, a rear part of the upper blade group 30 is a meshing block 33, and an inner rack 31 is arranged at a rear part of the meshing block 33; and the inner rack 31 and the outer rack 21 are respectively meshed with both sides of the driving gear 50.

The driving gear 50 and the rotating shaft member 40 are arranged on the fixed seat 10, and the rotating shaft member 40 makes the upper blade group 30 and the lower blade 20 rotate around it. Moreover, the meshing block 33 is arranged, the inner rack 31 is arranged at the rear part of the meshing block 33, the inner rack 31 faces the outer rack 21 at the rear part of the lower blade 20, and both sides of the driving gear 50 are meshed with the inner rack and the outer rack 21 respectively. Through this structure, the inner rack 31 and the driving gear 50 are located behind the outer rack 21, and there is no need to provide a position for mounting the driving gear between the upper blade 32 and the lower blade 20, such that the thickness is reduced. In addition, when driving, the driving gear 50, the upper blade 32 and the lower blade 20 all rotate in a circumferential direction in the same plane, and the situation that the upper blade 32 and the lower blade 20 open outwards since the circumferential rotation of the gear and the circumferential rotation of the upper blade 32 and the lower blade 20 are perpendicular to each other is avoided, thereby improving the stability of the bidirectional driving mechanism of electric scissors blades, and making the bidirectional driving mechanism of electric scissors blades more durable.

Figure 2:
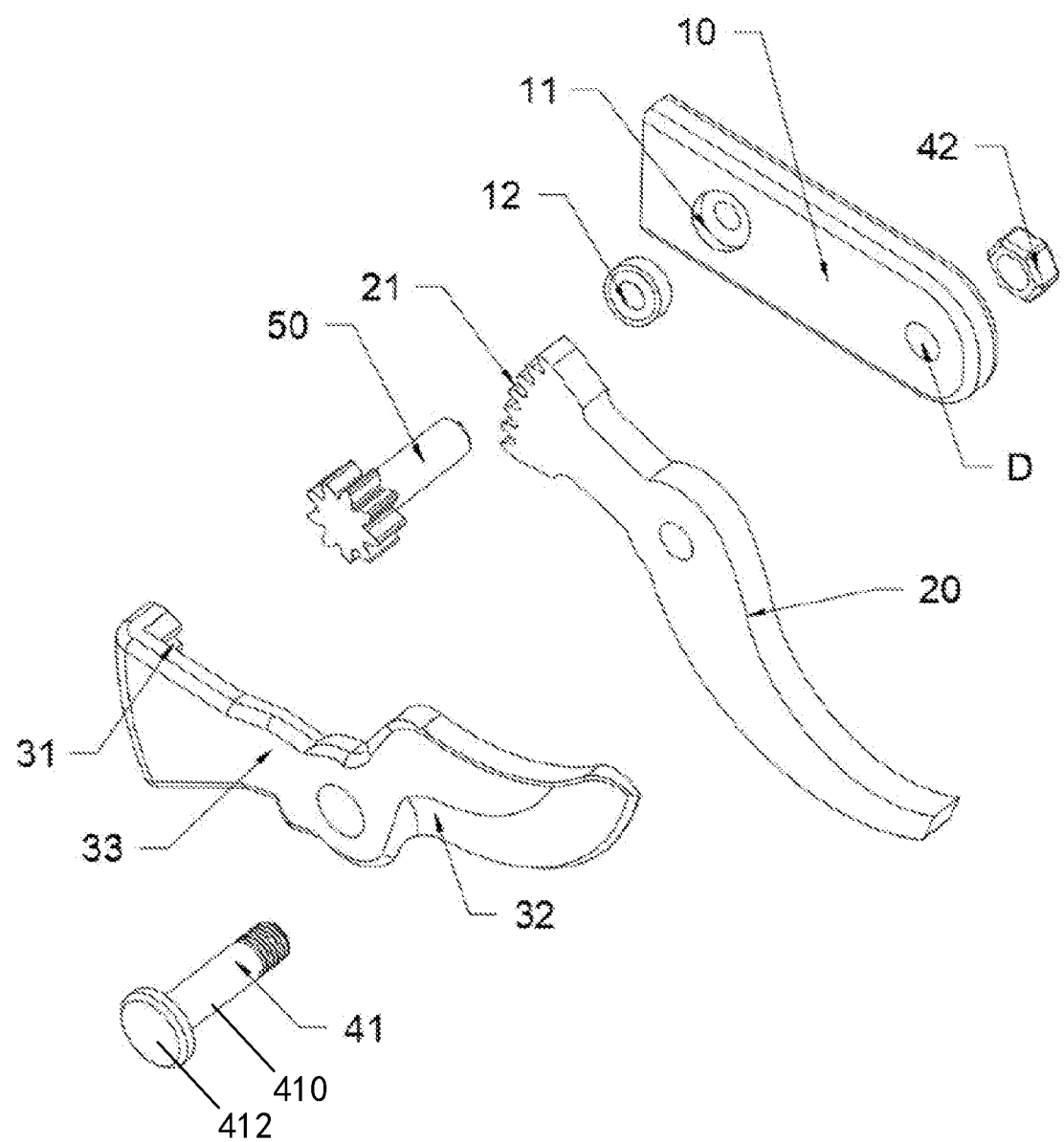
FIG. 2 is an exploded structural diagram of Embodiment 1 of the present disclosure.
Figure 4:
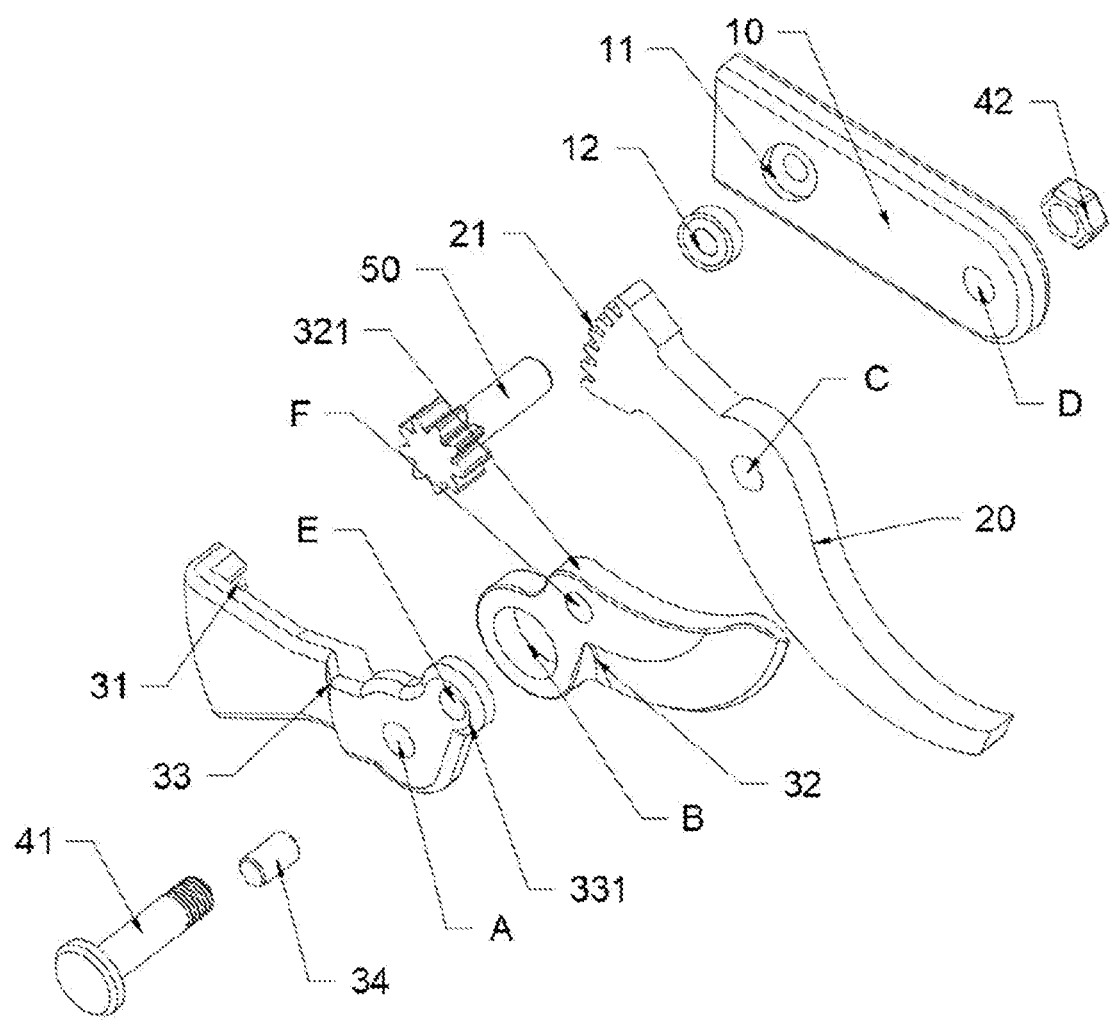
FIG. 4 is an exploded structural diagram of Embodiment 2 of the present disclosure.

Further, as shown in FIG. 2 and FIG. 4, the rotating shaft member 40 includes a stop screw 41 and a nut 42, a rotating shaft hole D is provided in the fixed seat 10, and the stop screw 41 passes through the rotating shaft hole D and is in threaded connection with the nut 42.

Further, as shown in FIG. 2 and FIG. 4, the stop screw 41 includes a connecting rod 410 and a limiting cap 412, one end of the connecting rod 410 is engaged with the limiting cap 412, and the other end of the connecting rod 410 is provided with threads. The stop screw 41 and the nut 42 are arranged, and the stop screw 41 includes the connecting rod 410 and the limiting cap 412, such that the detachable property is realized.

Figure 3:
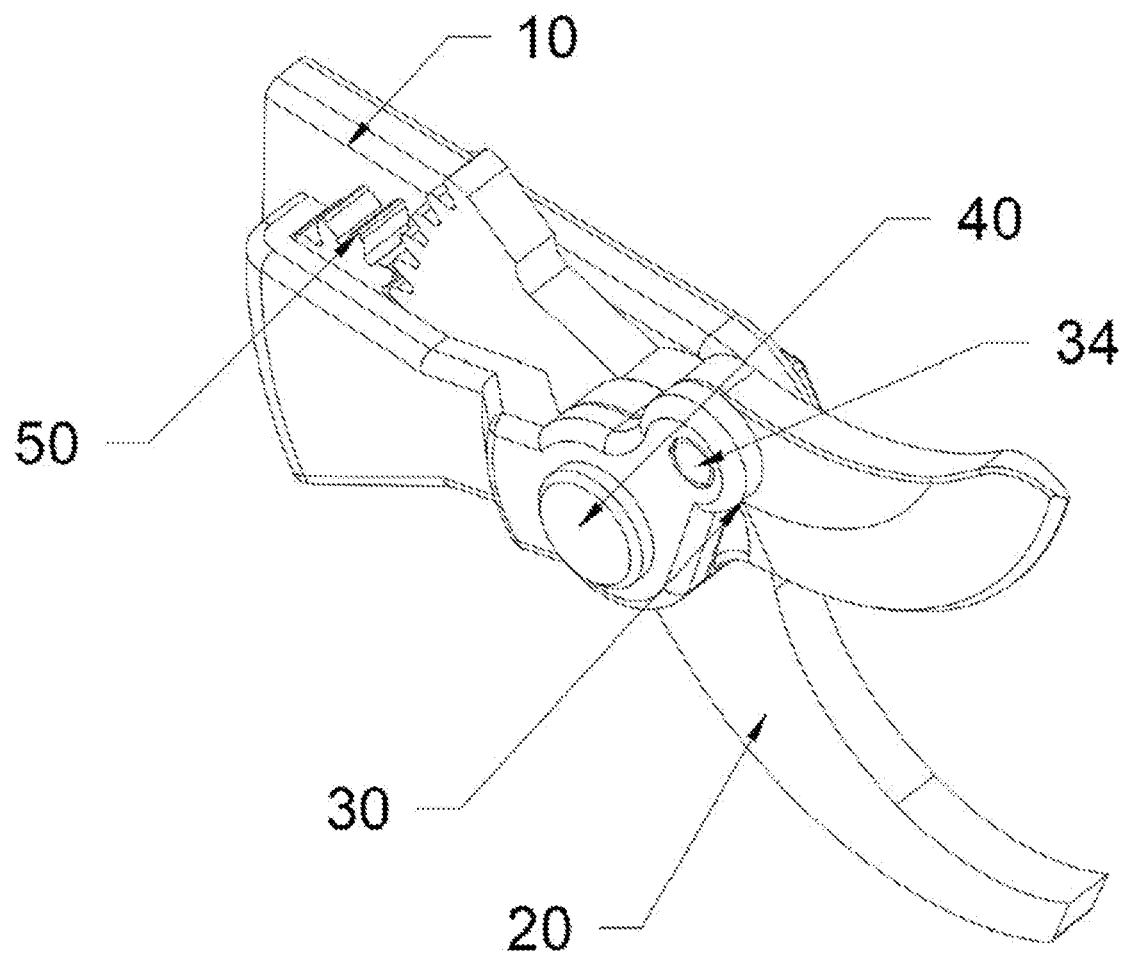
FIG. 3 is a schematic structural diagram of Embodiment 2 of the present disclosure.

Further, as shown in FIG. 3 to FIG. 4, a rotating shaft hole A is provided in a front part of the meshing block 33, a rotating shaft hole B is provided in a rear part of the upper blade 32, a rotating shaft hole C is provided in a middle part of the lower blade 20, and the rotating shaft hole A, the rotating shaft hole B and the rotating shaft hole C all rotate around the rotating shaft member 40; a pin hole E is also provided in the front part of the meshing block 33, a pin hole F is provided in the rear part of the upper blade 32, and a pin 34 is connected in both the pin hole E and the pin hole F. With this arrangement, the meshing block 33 and the upper blade 32 are of detachable structures, and thus can be detached for separate replacement when the inner rack 31 on a meshing portion is used for a long time or the upper blade 32 is used for a long time and the accuracy decreases, which improves the flexibility of replacement. Moreover, the pin 34 is arranged to cooperate with the rotating shaft member 40 to realize the mutual positioning and cooperation of the meshing block 33 and the upper blade 32, such that the meshing block 33 can drive the upper blade 32 to rotate to realize shearing.

Further, as shown in FIG. 3 to FIG. 4, a first protrusion 331 is arranged at the front part of the meshing block 33, and the pin hole E is located at the first protrusion 331; a second protrusion 321 is arranged at the rear part of the upper blade 32, and the pin hole F is located at the second protrusion 321; and suitable positions are provided for the pin holes.

Further, as shown in FIG. 3 to FIG. 4, the first protrusion 331 is arranged at a front upper side of the shaft hole A, and the second protrusion 321 is arranged at a front upper side of the shaft hole B. With this position structure, when the meshing block 33 drives the pin 34 to operate, a moving path of the pin 34 is just toward a connecting line between the rotating shaft hole of the upper blade 32 and the pin hole. During this process, the pin 34 swings by being vertically against the upper blade 32. With this arrangement, the wear between the pin 34 and the pin hole can be reduced to a minimum, and the stability of shearing can be improved, thereby further prolonging the service life of the bidirectional drive mechanism for electric scissors blades.

Further, as shown in FIG. 1 to FIG. 4, the outer rack 21 and the inner rack 31 are of arc-shaped structures; and the centers of circles corresponding to arcs of the outer rack 21 and the inner rack 31 are made correspond to a center line of the rotating shaft member 40, so as to realize close meshing with the driving gear 50.

Further, as shown in FIG. 2 and FIG. 4, a gear hole 11 is provided in the fixed seat 10, a deep groove bearing 12 is connected in the gear hole 11, and a pin shaft of the driving gear 50 is in running fit with the deep groove bearing 12, so as to realize rotation of the driving gear 50.

An electric scissors includes a driving assembly. An output end of the driving assembly is dynamically connected to the pin shaft of the driving gear 50 to drive the driving gear 50 to rotate, and the rotation of the driving gear 50 drives the outer rack 21 and the inner rack 31 to rotate synchronously, such that the upper blade 32 and the lower blade 20 swing up and down to complete shearing.

In the above technical means, in order to more illustrate the operating principle of the bidirectional drive mechanism for electric scissors blades clearly, further descriptions will be given from the following two embodiments:

Embodiment 1

Referring to FIG. 1 to FIG. 2, a bidirectional driving mechanism for electric scissors blades includes a fixed seat 10, a driving gear 50, a rotating shaft member 40, an upper blade group 30 and a lower blade 20. The driving gear 50 and the rotating shaft member 40 are arranged on the fixed seat 10, the lower blade 20 and the upper blade group 30 rotate around the rotating shaft member 40, an outer rack 21 is arranged at a rear part of the lower blade 20, a front part of the upper blade group 30 is the upper blade 32, a rear part of the upper blade group is a meshing block 33, and an inner rack 31 is arranged at a rear part of the meshing block 33; and the inner rack 31 and the outer rack 21 are respectively meshed with both sides of the driving gear 50. The rotating shaft member 40 includes a stop screw 41 and a nut 42, a rotating shall hole D is provided in the fixed seat 10, and the stop screw 41 passes through the rotating shaft hole D and is in threaded connection with the nut 42. The stop screw 41 includes a connecting rod 410 and a limiting cap 412, one end of the connecting rod 410 is engaged with the limiting cap 412, and the other end of the connecting rod 410 is provided with threads. In practical applications, the driving assembly drives the driving gear 50 to rotate, under the rotation of the driving gear 0 50, the bidirectional driving mechanism for electric scissors blade drives the inner rack 31 and the outer rack 21 to swing, thereby driving the upper blade 32 and the lower blade 20 to shear.

Embodiment 2

As shown FIG. 3 to FIG. 4, a bidirectional driving mechanism for electric scissors blades includes a fixed seat 10, a driving gear 50, a rotating shaft member 40, an upper blade group 30 and a lower blade 20. The driving gear 50 and the rotating shaft member 40 are arranged on the fixed seat 10, the lower blade 20 and the upper blade group 30 rotate around the rotating shaft member 40, an outer rack 21 is arranged at a rear part of the lower blade 20, a front part of the upper blade group 30 is an upper blade 32, a rear part of the upper blade group is a meshing block 33, and an inner rack 31 is arranged at a rear part of the meshing block 33. The inner rack 31 and the outer rack 21 are respectively meshed with both sides of the driving gear 50. The rotating shaft member 40 includes a stop screw 41 and a nut 42, a rotating shaft hole D is provided in the fixed seat 10, and the stop screw 41 passes through the rotating shaft hole D and is in threaded connection with the nut 42. The stop screw 41 includes a connecting rod 410 and a limiting cap 412, one end of the connecting rod 410 is engaged with the limiting cap 412, and the other end of the connecting rod 412 is provided with threads. A rotating shaft hole A is provided in a front part of the meshing block 33, a rotating shaft hole B is provided in a rear part of the upper blade 32, a rotating shaft hole C is provided in a middle part of the lower blade 20, and the o rotating shaft hole A, the rotating shaft hole B and the rotating shaft hole C all rotate around the rotating shaft member 40. A pin hole E is also provided in the front part of the meshing block 33, a pin hole F is provided in the rear part of the upper blade 32, and a pin 34 is connected in both the pin hole E and the pin hole F. In practical applications, the driving assembly drives the driving gear 50 to rotate, under the rotation of the driving gear 50, the bidirectional driving mechanism for electric scissors blade drives the inner rack 31 and the outer rack 21 to swing, thereby driving the upper blade 32 and the lower blade 20 to shear. When a part is damaged, the nut 42 is loosened, the mechanism is entirely disassembled to replace the damaged part. If the meshing block 33 or the upper blade 32 is damaged, the pin 34 is knocked out with a nail or similar tool, and then the meshing block 33 or the upper blade 32 is replaced.

For those skilled in the art, it is obvious that the present disclosure is not limited to the details of the foregoing exemplary embodiments, and the present disclosure can be implemented in other specific forms without departing from the spirit or basic characteristics of the present disclosure. Therefore, from any point of view, the embodiments should be regarded as exemplary and non-limiting in all respects. The scope of the present disclosure is defined by the appended claims rather than the above description. Therefore, all changes falling within the meaning and scope of the equivalents are encompassed in the present disclosure. Any numerals in the claims should not be regarded as the limiting to the claims involved.

What is claimed is:

1. A bidirectional driving mechanism for electric scissors blades, comprising a fixed seat, a driving gear, a rotating shaft member, an upper blade group and a lower blade, wherein the driving gear and the rotating shaft member are arranged on the fixed seat, the lower blade and the upper blade group rotate around the rotating shaft member, an outer rack is arranged at a side of the lower blade away from the rotating shaft member, a front part of the upper blade group is an upper blade, a rear part of the upper blade group is a meshing block, and an inner rack is arranged at a rear part of the meshing block; the driving gear is arranged at a side of the lower blade away from the rotating shaft member, the inner rack is arranged at a side of the driving gear away from the outer rack, and the inner rack and the outer rack are respectively meshed with both sides of the driving gear, the driving gear, the upper blade and the lower blade are configured to rotate in a circumferential direction in the same plane.

2. The bidirectional driving mechanism for electric scissors blades according to claim 1, wherein the rotating shaft member includes a stop screw and a nut, a rotating shaft hole (D) is provided in the fixed seat, and the stop screw passes through the rotating shaft hole (D) and is in threaded connection with the nut.

3. The bidirectional driving mechanism for electric scissors blades according to claim 2, wherein the stop screw comprises a connecting rod and a limiting cap, one end of the connecting rod is engaged with the limiting cap, and the other end of the connecting rod is provided with threads.

4. The bidirectional driving mechanism for electric scissors blades according to claim 3, wherein a rotating shaft hole (A) is provided in a front part of the meshing block, a rotating shaft hole (B) is provided in a rear part of the upper blade, a rotating shaft hole (C) is provided in a middle part of the lower blade, and the rotating shaft hole (A), the rotating shaft hole (B) and the rotating shaft hole (C) all rotate around the rotating shaft, member; a pin hole (E) is also provided in the front part of the meshing block, a pin hole (F) is provided in the rear part of the upper blade, and a pin is connected in both the pin hole (E) and the pin hole (F).

5. The bidirectional driving mechanism for electric scissors blades according to claim 4, wherein a first protrusion is arranged at the front part of the meshing block, and the pin hole (E) is located at the first protrusion; and a second protrusion is arranged at the rear part of the upper blade, and the pin hole (F) is located at the second protrusion.

6. The bidirectional driving mechanism for electric scissors blades according to claim 5, wherein the first protrusion is arranged at a front upper side of the shaft hole (A), and the second protrusion is arranged at a front upper side of the shaft hole (B).

7. The bidirectional driving mechanism for electric scissors blades according to claim 1, wherein the outer rack and the inner rack are of arc-shaped structures.

8. The bidirectional driving mechanism for electric scissors blades according to claim 1, wherein a gear hole is provided in the fixed seat, a deep groove bearing is connected in the gear hole, and a pin shaft of the driving gear is in running fit with the deep groove bearing.

9. An electric scissors, comprising the bidirectional driving mechanism for electric scissors blade according to claim 1.

* * * * *